United States Patent [19]
Bain et al.

[11] Patent Number: 5,154,390
[45] Date of Patent: Oct. 13, 1992

[54] ARTICULATED STAND FOR SUPPORTING OBJECT

[76] Inventors: Charles E. Bain, 210 N. 3rd St., West Dundee, Ill. 60118; Jeffrey A. Kennedy, 1015 Fox Run, Algonquin, Ill. 60102

[21] Appl. No.: 753,452

[22] Filed: Aug. 30, 1991

[51] Int. Cl.⁵ ............................................. A47B 97/04
[52] U.S. Cl. .................................. 248/447.2; 248/284; 248/291
[58] Field of Search ............ 248/291, 278, 279, 280.1, 248/281.1, 284, 122, 447, 441.1, 442.2, 447.2; 40/341; 403/93, 96

[56] References Cited

U.S. PATENT DOCUMENTS

| | | | |
|---|---|---|---|
| 2,621,882 | 12/1952 | Fletcher | 248/278 X |
| 3,193,674 | 7/1965 | Fleming | 248/278 X |
| 3,243,497 | 3/1966 | Kendall | 248/278 X |
| 3,317,225 | 5/1967 | Cooper | 248/291 X |
| 3,505,515 | 4/1970 | Adra | 248/291 X |
| 4,196,821 | 4/1980 | Teti | 248/291 X |
| 4,568,052 | 2/1986 | Solomon | 248/281.1 |
| 4,917,343 | 4/1990 | Wainscott | 248/447.2 |
| 4,949,928 | 8/1990 | Hoshino | 248/122 X |
| 4,987,690 | 1/1991 | Aaldenberg | 248/447.2 X |

*Primary Examiner*—J. Franklin Foss

[57] ABSTRACT

An activated arm stand with a base positioned on or securable to a stationary surface in which the base and an arm with a selected width are connected by a pair of aligned cylindrical portions each having a width less than the width of the arm. The cylindrical potions have V-shaped teeth which are urged together by an adjustable fastener and spring to hold the arm in a selected position. The base includes a surface which engages the arm to prevent its movement into a portion of the 360° rotation even when the teeth are disengaged. The arm stand may include a toothless joint engagement arrangement in which a tooth joint portion is made toothless with a conversion washer.

7 Claims, 6 Drawing Sheets

ARTICULATED STAND FOR SUPPORTING OBJECT

BACKGROUND OF THE INVENTION

Adjustable supports for holding and positioning objects such as document holders are old (U.S. Pat. No. 4,917,343). Pivotal cantilevered arm arrangements have been suggested (U.S. Pat. No. 4,682,749) and various joint constructions for connecting covers have been proposed (U.S. Pat. No. 4,545,555) including sets of opposing teeth (U.S. Pat. No. 502,601). Further, a slot arrangement for supporting a document holder on a stand is old (U.S. Pat. No. 4,787,595)

Nevertheless, a lightweight compact noncollapsible readily adjustable holder has not heretofore been available to the art.

SUMMARY OF THE INVENTION

Broadly, the present invention is an object support device mountable on or to a fixed surface including a base mount and an adjustable arm with the mount and arm joined together for adjustment. The adjustable joint comprises two aligned cylindrical portions with opposing surfaces including configured teeth which are moved toward or released to move away from one another by operating fastener means.

It is a feature that a plurality of arms may be similarly connected through selected portions of 360° rotation and that one arm carries the object to be supported such as a detachable easel.

DESCRIPTION OF THE PREFERRED EMBODIMENT

Figure 1:
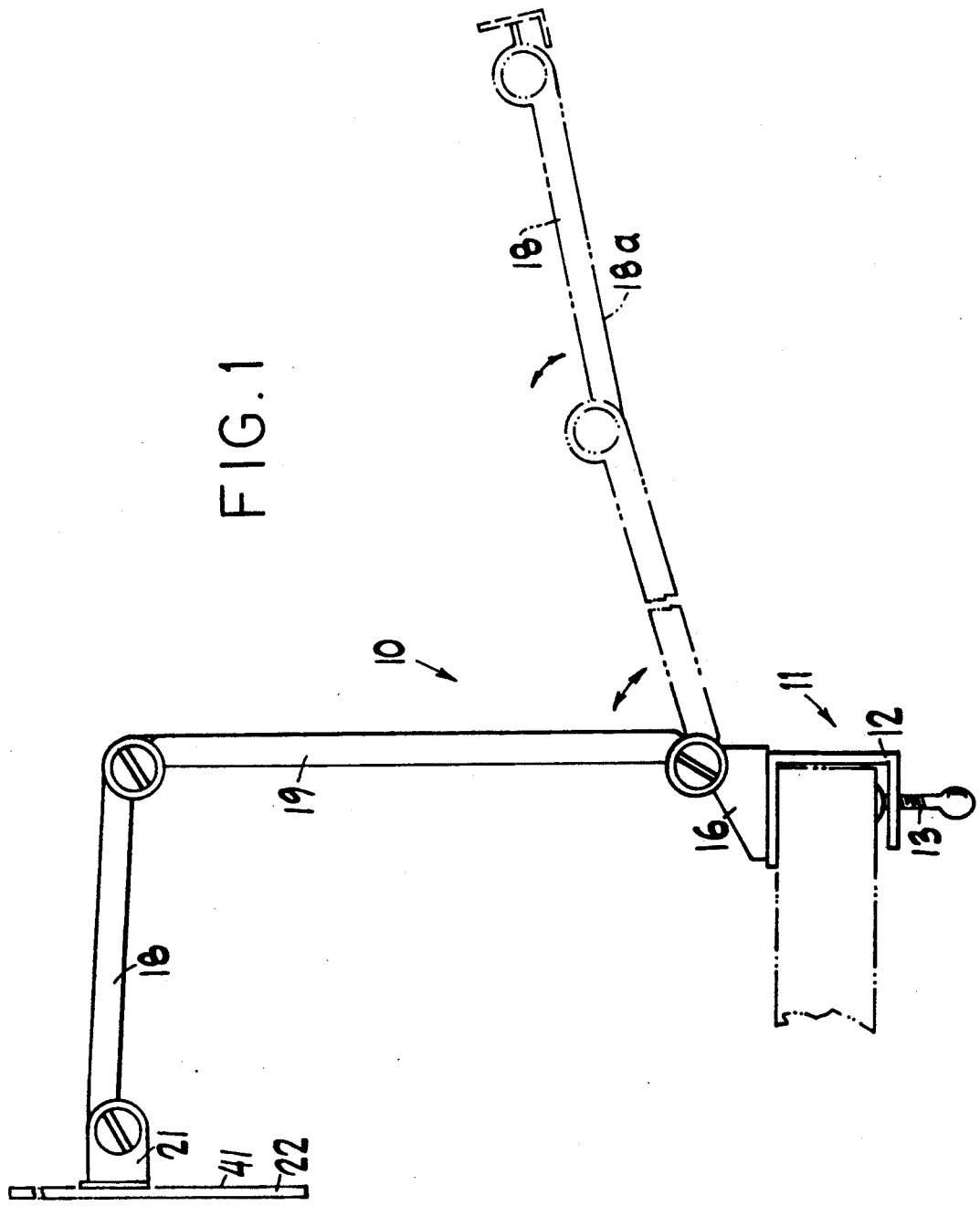
FIG. 1 is an elevational view of the copyholder clamped to a desktop shown in two positions.

In the figures, holder device 10 includes clamp unit 11 including U-shaped frame 12 and screw clamp 13. Holder 10 also includes frame mount 16, long arm 19, short arm 18, easel mount 21 and easel 22 with easel back 41. Holder 10 may also be utilized to support a lamp 20 on arm 18' (see FIG. 9). Clamp unit 11 may be substituted for a weighted base 15 (FIG. 10) or other means for anchoring the holder to a horizontal or vertical surface.

Figure 2:
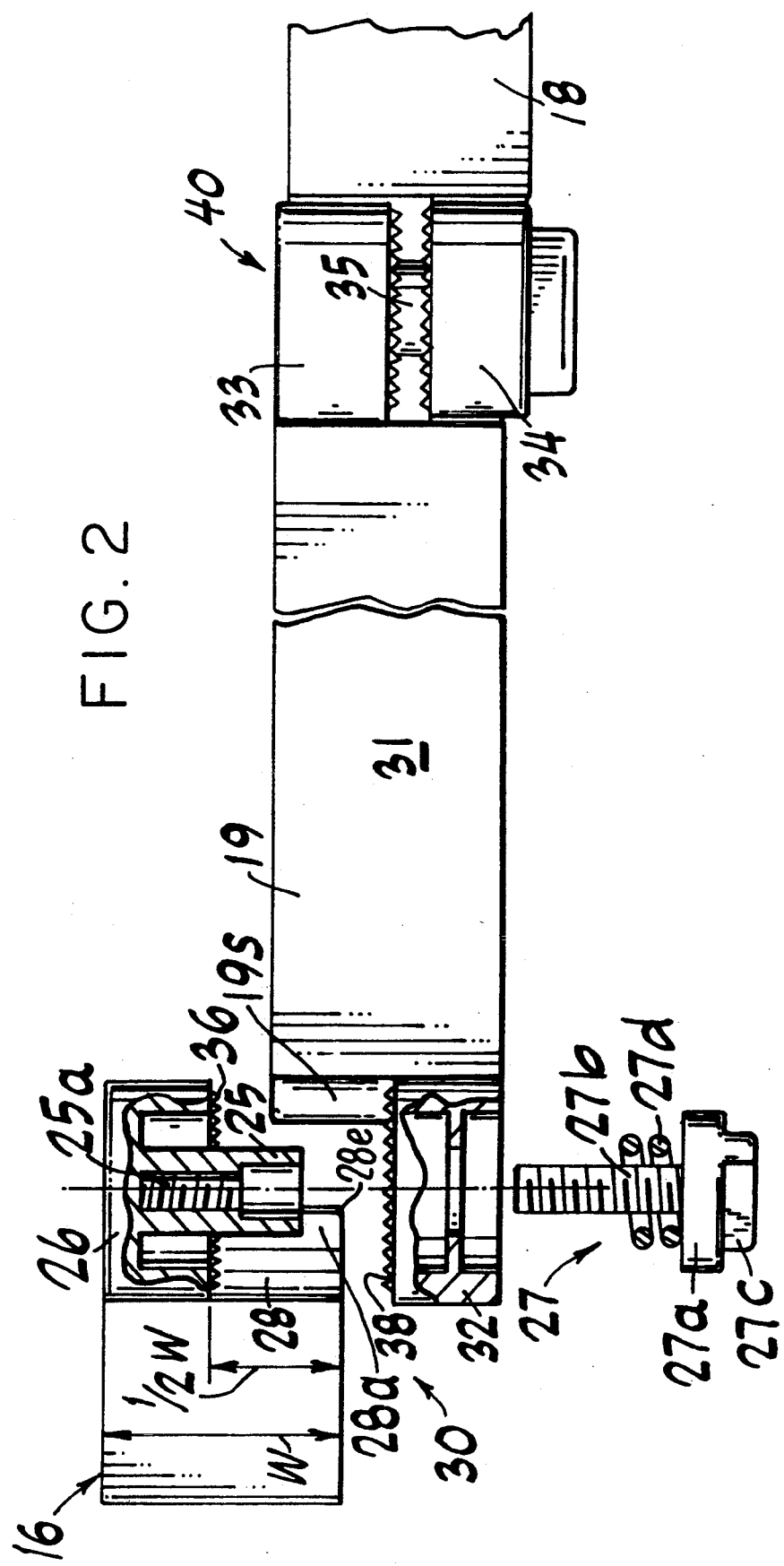
FIG. 2 is an exploded partial view of an arm positioned for attachment to a holder mount and another adjacent arm.
Figure 3:
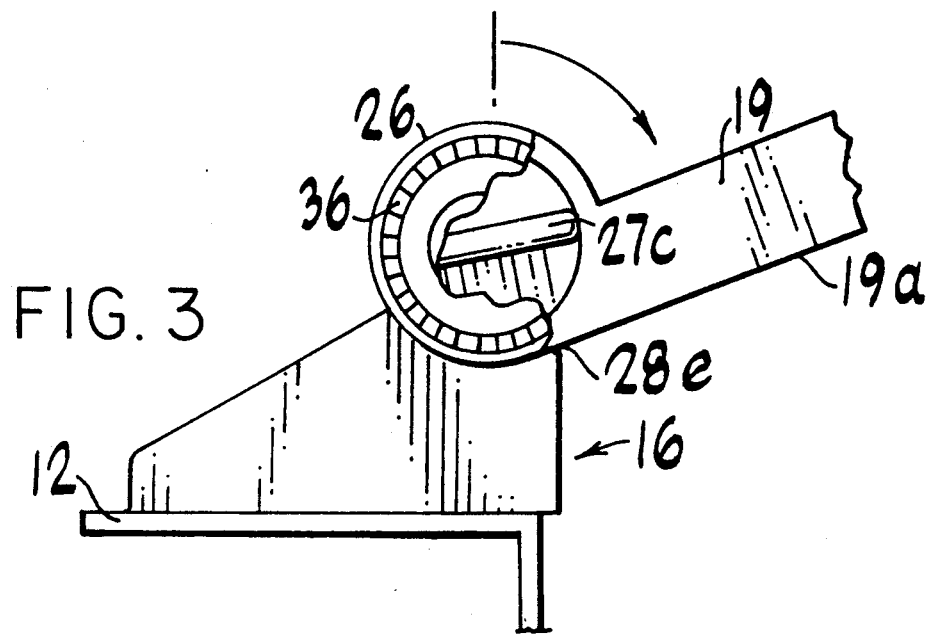
FIG. 3 is a partial elevational view showing the arm-mount engagement.

Turning to FIG. 2, frame mount 16 has width (w) and comprises a cylindrical portion 26 integrally formed therewith which extends approximately one-half the width of mount 16 (½ w). Cylindrical portion 26 includes a projection 25 with threaded bore 25a to receive threaded fastener 27. Frame mount 16 also includes a curved recess 28 with surface 28a to receive arm 19 as further described. Surface 28a is one-half the width (w) of the mount 16.

Arm 19 includes arm frame 31 and cylindrical portions 32, 33 at each end for mating with cylindrical portion 26 of frame mount 16 and cylindrical portion 34 of arm 18. Each cylindrical portion 26, 32, 33 and 34 is about ½ the width of the mount or arm. Cylindrical portions 26, 32 each carry a ring of V-shaped teeth rings 36, 38 which are urged together by fastener 27. Fastener 27 includes recessible head 27a, threaded stem 27b and thumb piece 27c. Spring 27d urges portion 32 toward portion 26.

The cylindrical portions 26, 32 together with fastener 27 and curved arm recess 19s comprise an adjustable joint 30 which may be adjusted to a variety of angles. Adjustment is accomplished by turning fastener 27 until teeth rings 36, 38 are spaced apart a distance to permit turning with teeth passing teeth. After arm 31 is positioned as desired, fastener 27 is tightened to hold the teeth rings 36, 38 in interlocked engagement.

Figure 7A:
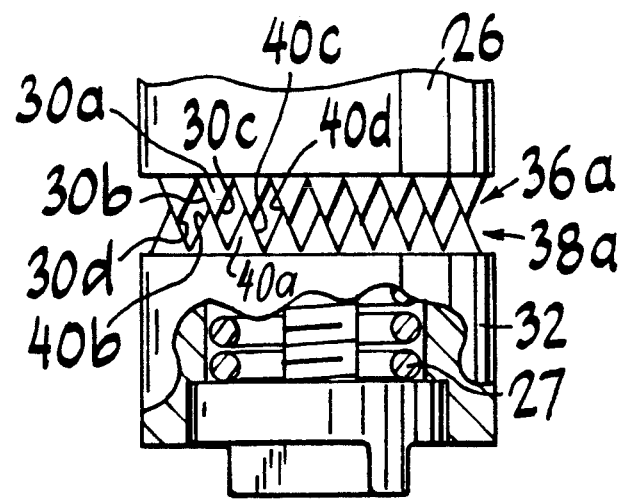
FIG. 7a is an enlarged plan view of partial engagement of teeth rings.
Figure 7B:
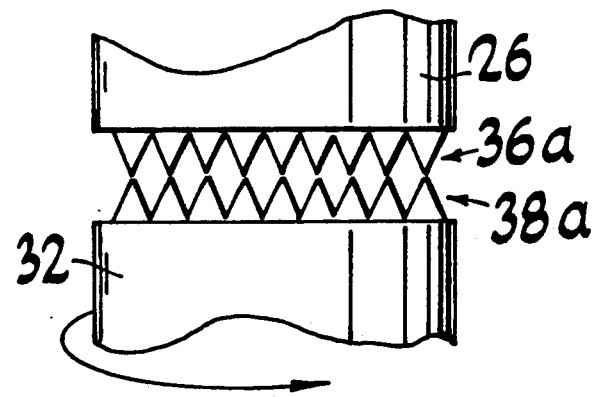
FIG. 7b shows the teeth rings clearing one another to permit turning.

Turning to FIGS. 7(a)-(b), individual teeth 36a of teeth ring 36 include bases 30a; sloping sides 30b, 30c and tip 30d. Teeth 38a on ring 38 are similarly shaped, with each tooth having a base 40a, sloping sides 40b, 40c and tip 40d. FIG. 7(b) shows teeth 36a, 38a spaced to permit turning of cylindrical portion 32 relative to portion 26.

Arms 18, 19 are limited in their rotation clockwise as viewed in FIG. 1. Straight back surface 19a of arm 19 engages edge area 28e of surface 19s (FIGS. 1 and 2) and similarly joint 40 comprising aligned cylindrical portions 33, 34 is not positionable at all 360° positions. Joint 40 like joint 30 includes the restriction that arm 18 once turned clockwise to the position of FIG. 1 (dotted-dashed lines) can turn no further because the back surface 18a of arm 18 engages curved surface 35 area adjacent cylindrical portion 33 of arm 19. This joint feature prevents total collapse of the holder. There is no similar restriction against arm movement counterclockwise thus permitting folding and storage.

Figure 4:
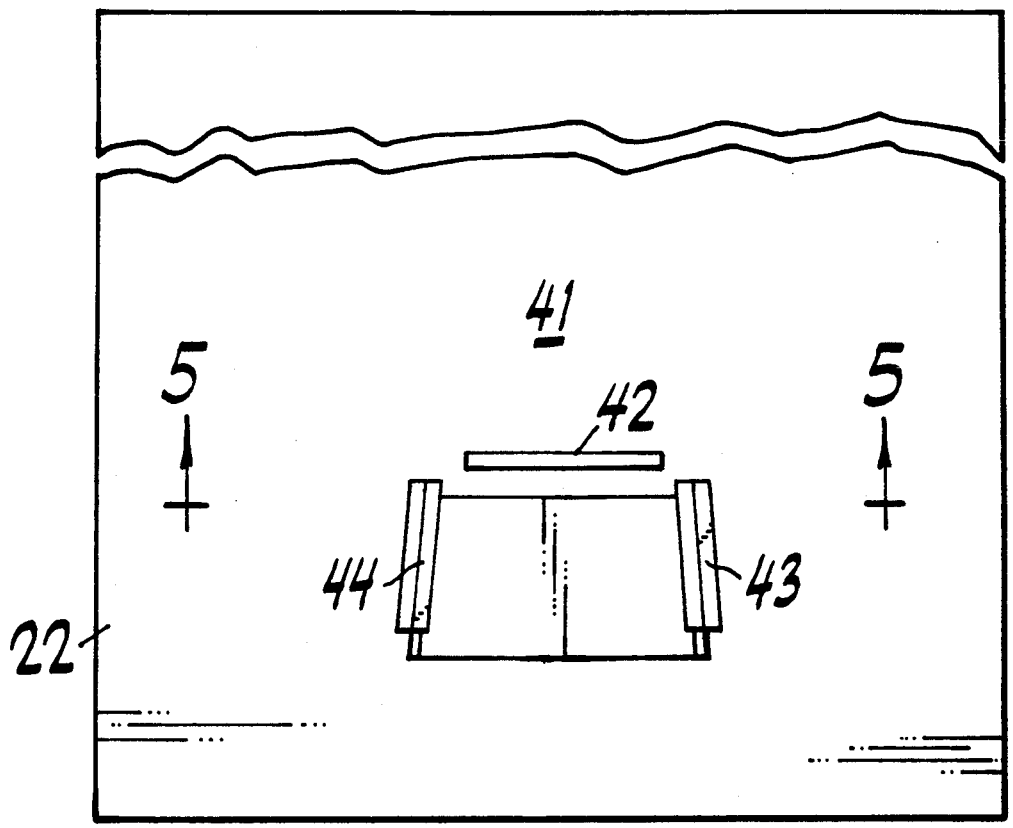
FIG. 4 is an elevational view of a back of the easel and upper arm insert plate for detachably engaging the easel.
Figure 5:
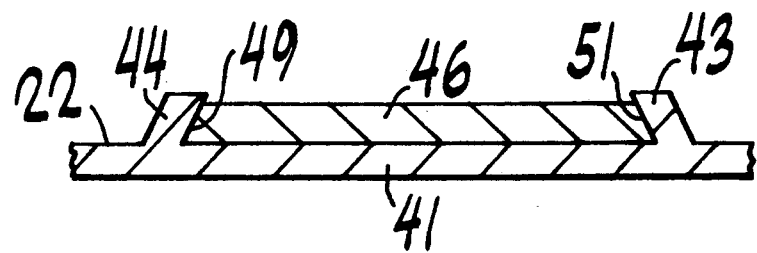
FIG. 5 is a sectional view taken along line 5—5 of FIG. 4.
Figure 6:
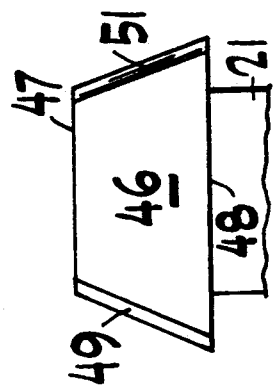
FIG. 6 is an elevational view of the easel holder.

Turning to FIGS. 4, 5 and 6, easel 22 includes easel back surface 41 having horizontal stop piece 42 and two angled pieces 43, 44 for receiving trapezoidal plate 46 (FIG. 6). Plate 46 has horizontal top edge 47, horizontal bottom edge 48 and sloping sides 49,51. Sides 49, 51 include wedge shaped edges 49a, 51a which are angled to complement angled side pieces 43,44.

Figure 8A:
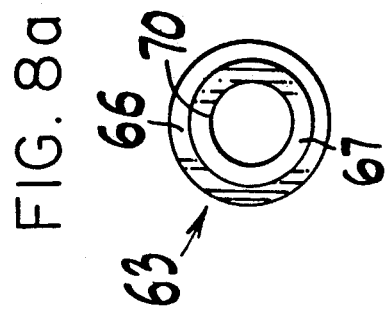
FIG. 8a is a plan view of a circular rubber washer.
Figure 8:
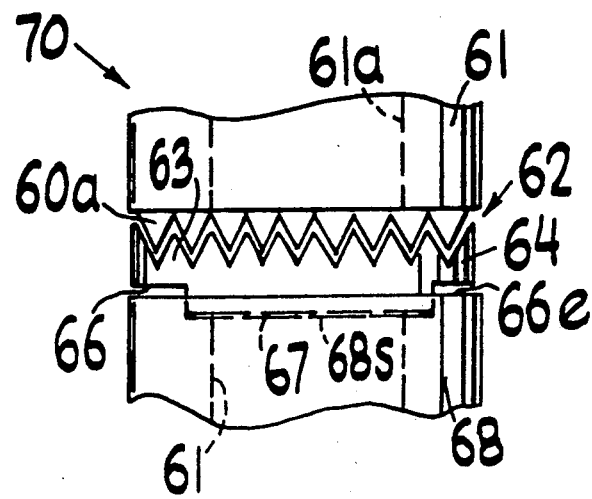
FIG. 8 shows an alternative joint having teeth, a rubber washer and engaging the flat surface joint half.

Turning to FIGS. 8 and 8(a), an alternative joint 70 is shown, preferably for use adjacent the easel, lamp or other object requiring infinite adjustment, in which tooth joint portion 61, with fastener 27 (not shown) in passageway 61a, has a ring 62 of teeth 60a; a washer 63 with a ring of teeth 64 mating with ring 62. Ring 63 has on its back two tier concentric surfaces 66, 67 for frictional engagement with the other toothless joint 68 surfaces 67 and 66e. Concentric ring surface 66 frictionally engages joint portion end 66e while indented surface 67 engages recess surface 68s. FIG. 8(a) shows the washer two tier surfaces 66, 67 with fastener-receiving passageway 70.

Figure 10:
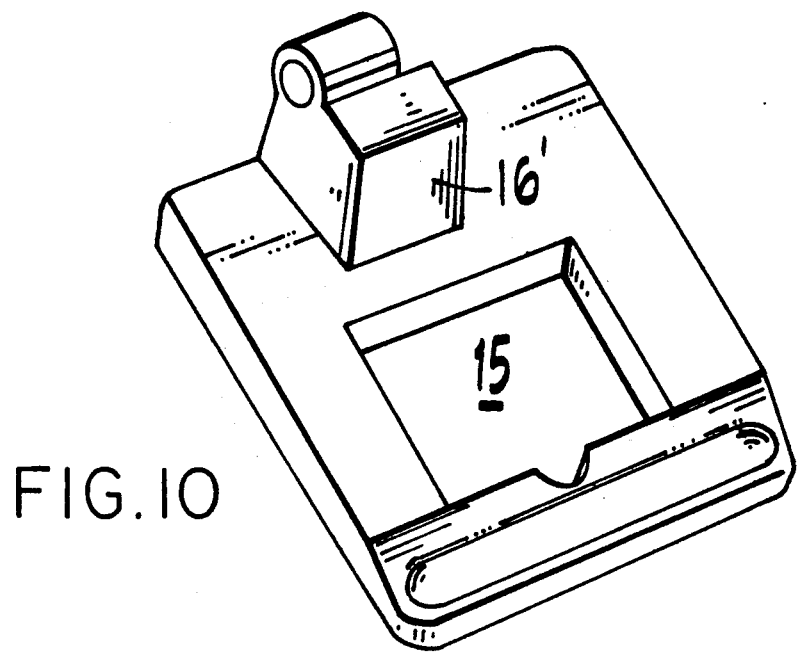
FIG. 10 is a perspective view of a weighted stand.
Figure 9:
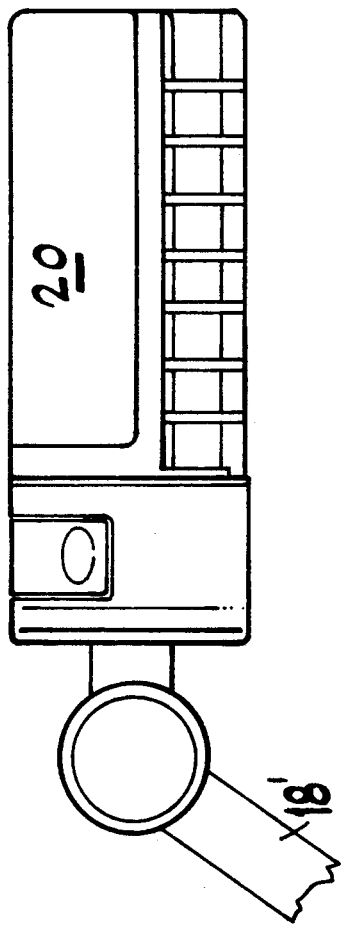
FIG. 9 is a partial elevational view of an alternative embodiment in which a lamp is substituted for the easel.

Finally, FIG. 9 shows an alternative embodiment in which a lamp 20 is held by arm 18, and FIG. 10 shows a further embodiment in which the device employs a weighted base.

In operation of holder 10, teeth rings 36, 38 are normally urged together by spring 27d and the variable compression caused by tightening or loosening stem 27b. When stem 27b is loosened sufficiently, teeth rings 36, 38 can be rotated relative to one another by exerting a twisting force to cause the sides 30b, 30c and 40b, 40c of teeth 30, 40 to move relative to one another until teeth tips 30d, 40d pass each other (FIG. 7b). The relatively large size of and the shape of teeth 30a, 40a as shown permit relative movement of the rings 36, 38 without collapse of the holder arms. While the rings are not engaged for an instant, no collapse occurs. The shape of the teeth facilitate re-engagement before collapse.

Similarly, the joint 70 is operated by loosening fastener 27, adjusting and retightening to urge surfaces 66, 66, 67 and 68s together. Since no teeth are involved joint 70 is infinitely variable.

I claim:

1. A holder for positioning on or in engagement to a fixed surface comprising
   a) a base mount having a selected width for engagement to such surface which mount includes a cylindrical portion and a recess defined in part by a curved surface;
   b) an arm pivotally secured to the mount, such arm having substantially the same width as the base mount;
   c) the cylindrical portion of the mount and a cylindrical portion on a first end of the arm positioned, in tandem which tandem portions have a width substantially equal to and coterminous with the widths of the base mount and the arm; said cylindrical portions positionable to form an adjustable joint in turn comprising
      i) a first set of teeth on the mount cylindrical portion;
      ii) a second set of teeth on the arm cylindrical portion;
      iii) hand operable fastener means for drawing the portions to engage the sets of teeth; and
   d) a surface on the arm for engaging the recess curved surface to limit the arm movement.

2. The holder of claim 1 having an additional second arm of such selected width and having a cylindrical portion having a width that is a portion of the selected width and the first arm having a cylindrical portion on its second end positioned for coterminous alignment with additional arm cylindrical portion to form a second adjustable joint.

3. The copyholder of claim 1 having in addition an easel with raised angled border means on it and having an arm with angled projection means for insertion between the raised border means.

4. The copyholder of claim 1 having a resilient washer between said sets of teeth.

5. A holder having a base and one or more arms for supporting an object such as a copyholder in various positions relative to its base comprising
   a) anchor means for anchoring the base on or to a surface;
   b) joint means between the base or one or more arms, said joint means in turn comprising
      i) a first set of shaped teeth;
      ii) a first planar surface;
      iii) a two-sided washer having a complementary set of teeth on one side and a second planar surface frictionally engageable to the first planar surface; and
      v) spring means for urging the sets of teeth and planar surfaces together
   thereby adjustment can be accomplished by the sets of teeth or planar surfaces or both relative to one another.

6. A holder of claim 5 having a second arm between the first arm and the object and a joint of two portions between such second arm and the object comprising a set of teeth on one portion, a flexible washer with complementary teeth on one side and a flat surface on the other side and a toothless surface on the other joint portion.

7. The holder of claim 5 in which the arm and teeth are made of plastic material.

* * * * *

UNITED STATES PATENT AND TRADEMARK OFFICE
CERTIFICATE OF CORRECTION

PATENT NO. : 5,154,390

DATED : October 13, 1992

INVENTOR(S) : Charles E. Bain and Jeffrey A. Kennedy

It is certified that error appears in the above-identified patent and that said Letters Patent is hereby corrected as shown below:

Column 3, line 4 "arm 18," should read --arm 18',--.

Column 4, line 33, "v)" should read --iv)--.

Signed and Sealed this

Eleventh Day of January, 1994

Attest:

BRUCE LEHMAN

*Attesting Officer*      *Commissioner of Patents and Trademarks*